US012670271B2

(12) United States Patent
Spencer et al.

(10) Patent No.: US 12,670,271 B2
(45) Date of Patent: Jun. 30, 2026

(54) GRAPHQL ACCESS AUTHORIZATION

(71) Applicant: Curity AB, Vårgårda (SE)

(72) Inventors: Travis Spencer, Vårgårda (SE); Jacob Ideskog, Vårgårda (SE); Pedro Fèlix, Vårgårda (SE); Paulo De Athaydes, Vårgårda (SE)

(73) Assignee: Curity AB, Vårgårda (SE)

( * ) Notice: Subject to any disclaimer, the term of this patent is extended or adjusted under 35 U.S.C. 154(b) by 26 days.

(21) Appl. No.: 18/844,612

(22) PCT Filed: Mar. 22, 2023

(86) PCT No.: PCT/EP2023/057292
§ 371 (c)(1),
(2) Date: Sep. 6, 2024

(87) PCT Pub. No.: WO2023/180364
PCT Pub. Date: Sep. 28, 2023

(65) Prior Publication Data
US 2025/0181733 A1 Jun. 5, 2025

(30) Foreign Application Priority Data

Mar. 22, 2023 (EP) .................................... 22163827

(51) Int. Cl.
*G06F 21/60* (2013.01)
*G06F 21/31* (2013.01)
*G06F 21/62* (2013.01)

(52) U.S. Cl.
CPC ............ *G06F 21/604* (2013.01); *G06F 21/31* (2013.01); *G06F 21/6227* (2013.01)

(58) Field of Classification Search
CPC ..... G06F 21/604; G06F 21/31; G06F 21/6227
See application file for complete search history.

(56) References Cited

U.S. PATENT DOCUMENTS

| | | | | | |
|---|---|---|---|---|---|
| 2009/0320093 | A1* | 12/2009 | Glazier | .................... | G06F 8/10 |
| | | | | | 726/1 |
| 2013/0332985 | A1* | 12/2013 | Sastry | ................. | G06F 21/6236 |
| | | | | | 726/1 |

(Continued)

OTHER PUBLICATIONS

Frank Pallas et al.: "Configurable Per-Query Data Minimization for Privacy-Compliant Web APis", arxiv.org, Cornell University Library, 201 Olin Library Cornell University Ithaca, NY 14853, Mar. 18, 2022, pp. 1-17, Retrieved from the Internet: https://arxiv.org/pdf/2203.09903.

(Continued)

*Primary Examiner* — Hee K Song
(74) *Attorney, Agent, or Firm* — Miller Nash LLP

(57) ABSTRACT

A system, method, and computer program for authorizing GraphQL access by calling an authorization engine to obtain an authorization decision and conforming to its obligation objects. A requester sends a message to a GraphQL function containing a query or mutation operation. The request is validated and authenticated. The authorization engine is called; it renders an access control decision and may obligate the GraphQL function to adhere to certain requirements when carrying out that decision. A GraphQL engine executes the operation when the authorization engine has not denied access and the obligation objects can be conformed to. The GraphQL engine fetches data from data sources. The GraphQL engine returns operation results which are further adhered to according to the obligation objects of the authorization engine or returns an error. The operation results are updated if so required by the obligation objects of the authorization engine. The possibly updated operation results are returned to the requester.

13 Claims, 5 Drawing Sheets

(56) References Cited

U.S. PATENT DOCUMENTS

| | | | |
|---|---|---|---|
| 2017/0063931 A1 | 3/2017 | Seed et al. | |
| 2018/0210927 A1 | 7/2018 | Karam et al. | |
| 2019/0340287 A1* | 11/2019 | Tamjidi | G06F 16/242 |
| 2020/0226140 A1 | 7/2020 | Tamjidi et al. | |

OTHER PUBLICATIONS

Tamas Sallai: "How to implement access control in a GraphQL API—Advanced Web Machinery" , Jan. 18, 2022 (Jan. 18, 2022), XP055956737, Retrieved from the Internet: URL:https://web.archive.org/web/20220118161648/https://advancedweb.hu/how-to-implement-access-control-in-a-graphql-api/, pp. 1-19.
International Search Report and Written Opinion, PCT/EP2023/057292, May 10, 2023.
International Preliminary Report on Patentability, PCT/EP2023/057292, Jul. 16, 2024.

* cited by examiner

300

304    301    303    302

400

401    402

GRAPHQL ACCESS AUTHORIZATION

CROSS-REFERENCE TO RELATED APPLICATIONS

This application is a 371 of International Application No. PCT/EP2023/057292, filed Mar. 22, 2023, which claims priority to and the benefit of European Patent Application No. 22163827.3 filed Mar. 23, 2022, both of which are incorporated herein by reference in their entirety.

TECHNICAL FIELD OF THE INVENTION

The present invention relates to authorization of data access using GraphQL.

BACKGROUND OF THE INVENTION

As stated on the GraphQL Wikipedia page, "GraphQL is an open-source data query and manipulation language . . . and a runtime for fulfilling queries with existing data. GraphQL was developed internally by Facebook in 2012 before being publicly released in 2015." What it doesn't say on Wikipedia nor in the open-source project's documentation is how to perform fine-grained authorization on different nodes of data within the graph being queried. This is not surprising considering the difficultly of this problem and the newness of GraphQL.

This cutting-edge technology can be used to operate on multiple nodes in the same graph structure. A graph contains nodes, and parameterized edges between those. A GraphQL operation acts on a sub-graph of the entire graph of data where selected nodes in the sub-graph can represent different kinds of data. Each such node may be retrieved from separate data stores and may require different authorization rules to be enforced prior to access. For example, one node within a sub-graph may represent user accounts whereas another node within the same sub-graph may represent devices. It follows that each sub-graph, and perhaps even the nodes within every possible sub-graph, may be authorized using different rules. This means that an authorization decision needs to be made per operation and per node in the graph.

A selection set is communicated to the GraphQL function in a message sent by a requester. This selection set is used to select a particularity sub-graph. The selection set contains a set of selections, where each selection may contain a nested selection set, to be returned after the operation has completed; these are not possible to fully authorize before the operation results are calculated if the decision relies on the data itself. For example, an email address on an account may be OK to return only if the username in the account matches the username from the access token that authenticated the requester. Instead of using existing techniques which are simplistic by comparison to the present disclosure, it is more efficient and secure to make authorization decisions considering all factors—the operation, the selection set, and the data of the selected sub-graph. Examples of existing methods that are insufficient include relying solely on authentication of the GraphQL requester or pre-parsing the entire request and authorizing it without the operation results.

As described below, the solution can be quite complex. Recognizing that authorization can be challenging, a method and apparatus are disclosed in US 2017/0063931 where an Access Control List (ACL) and other rules are updated dynamically as static rules are found to be inapplicable to a particular request. However, US 2017/0063931 does not explain how dynamic authorization can be applied in the case of GraphQL where not all data is known when an authorization check is required.

The problem of authorizing access to graph-based data is also considered in US 2018/0210927. However, US 2018/0210927 simply states that inputs are "received from an authorized and validated source." It is not disclosed how this authorization decision is obtained nor how the graph data is used to arrive at such a decision.

Document US 2020/0226140 goes further into the topic of authorizing access to graph data by disclosing a method and system that uses an ACL to stipulate what tables and columns within a database may be accessed by users of a customized GraphQL framework. However, document US 2020/0226140 does not specify how access to non-relational data can be controlled. It also does not say how to control access to instance data of the schema-only the schema itself. The system in US 2020/0226140 uses the ACL to check which tables and fields (schema data) that a user should be allowed to access (e.g., the email column of the user table). From this, their invention renders a partial GraphQL schema that is used for authorization purposes. Considering the email example above, one is still left asking: What if the user should only be allowed to access the email column if their email address ends in "@example.com"? Such email data is instance data (a value in a database cell), not schema data (the entire email database column).

To further clarify, authorization based on schema data makes it possible to authorize certain fields or sections for particular users or groups. When authorization is based on instance data the difference is that the values in the result or request may be taken into consideration in the authorization decision. When authorizing an update (i.e., a mutation) of a user account, for example, the authorization policy may stipulate that a user is only authorized to update an account if the user belongs to the same organization as the account that is being updated. This means that the value for the organization in the data needs to be compared with the organization of the user that made the request. Authorization using instance data is further complicated by the fact that the organization may not be a field that the requestor asks for. Thus, further mechanisms are needed to make sure enough instance data is available to make the authorization decision.

The article "How to implement access control in a GraphQL API—advanced web machinery", by Tamas Sallai, 18 Jan. 2022, discusses access control using a "resolver", i.e. a sort of data fetcher. The resolver is used to allow access control based on instance level data. However, in this approach, the "resolver" is coded directly into the GraphQL engine. Any change in access policy requires reprogramming of the engine.

GENERAL DISCLOSURE OF THE INVENTION

It is an object of the present invention to overcome, or mitigate, the shortcomings of the prior art, and provide a more versatile solution for access control for GraphQL.

According to a first aspect of the present invention, this and other objects are achieved by a method for authorizing access to a GraphQL request, comprising: receiving a message from a requester to a GraphQL function on behalf of an authenticated subject, the message including: at least one operation including a selection set identifying data to be fetched from a plurality of data sources and an access token pertaining to the authenticated subject and containing subject data; authenticating the subject using the access token;

making a call to an authorization engine applying an access policy, the call including at least the name of the GraphQL function and the subject data; receiving from the authorization engine an authorization decision based on the access policy and a set of obligation objects, each obligation object including one or more decision functions; obligation objects causing a GraphQL engine to execute the operation and fetch data from a plurality of data sources that correspond to the selection set in the operation; receiving results of the operation from the GraphQL engine; invoking the decision functions of the obligation objects received from the authorization engine are conformed to using the operation results received from the GraphQL engine; and, if the decision functions return an approval, returning the operation results to the requester.

With this approach GraphQL access is authorized by calling an authorization engine to obtain an authorization decision and conforming to obligations provided in the form of obligation objects. A requester sends a message to a GraphQL function containing a query or mutation operation. The request is validated and authenticated. The authorization engine is called; it renders an access control decision and may obligate the GraphQL function to adhere to certain requirements when carrying out that decision. A GraphQL engine executes the operation when the authorization engine has not denied access. The GraphQL engine fetches data from data sources. The GraphQL engine returns operation results and the decision functions of the obligation objects are invoked using the operation results. The operation results are updated if so required by the obligation objects of the authorization engine. The possibly updated operation results are returned to the requester.

The obligation objects are not mere instructions to be carried out; an obligation object may need to alter the incoming request in order to make sure enough data is retrieved from the GraphQL engine, or it may even need to pre-fetch some data to make sure that enough data exists to make decisions. Obligation objects should be thought of as logic that can make the actual authorization decision using the conclusion or intermediate decision rendered by an authorization engine. As an example, consider a case where a user may modify data belonging to the same organization. The obligation may need to alter the requested data to make sure it contains the organizationId of the resource, and it may need to fetch the user's organizationId if that is not present in the request. Then, an authorization decision can be made. The obligation objects include decision functions that may contain parts of, or the entire policy of, the original authorization engine. In such cases, the obligation objects can be considered to be a deferred authorization decision.

Document US 2013/0332985 A1 introduces a system that authorizes access with the use of "obligations". These obligations are not to be considered deferred authorization decisions. Instead, they are merely an additional procedural action that needs to be taken by the entity needing the authorization for an approval to be valid. For example, the obligation in par. 058 of US 2013/0332985 A1 requires the caller to send an SMS to the user in order to utilize the approval to perform the requested operation. This is different from the obligations discussed in the present disclosure where the obligations are conveyed as obligation objects including decision functions that need to be invoked with more input and that may alter the output of the operation in order to satisfy the given policy. The obligation objects in the present disclosure may contain the entire authorization policy or interact with a policy engine and is, thus, able to re-evaluate or refine the authorization decision at a deferred stage.

Compared to prior art solutions, the present invention works with non-relational data, and it also considers instance data. In other words, the invention is not restricted to making authorization decisions based solely on schema data of a relational database but actual values (i.e., instance data) in any kind of data source. The way in which it achieves this is by complying to the requirements conveyed in the obligation objects provided an authorization engine.

The use of obligation objects to control access to a GraphQL function and provide a deferred authorization decision is an important aspect of the present invention. Authorization and access control are well known. The general notion of the policy engine and how to use it are also somewhat commonly understood. How this body of knowledge and prior art can be used with GraphQL is not. The primary difficulty in applying this existing understanding to GraphQL stems in part from the fact that very little of the message is known until it has been fully parsed, that each part of the requested data graph may contain sub-graphs that follow different authorization rules than each other and/or the parent node, and that the request may contain multiple operations. (The operation may be a query, a mutation, or any other type of GraphQL operation.) Furthermore, there are cases where the operation results themselves are needed to authorize the request (as in the email example above). These challenges are overcome by the usage of obligation objects.

The procedure of using obligation objects can be described as ensuring that the GraphQL function conforms to a set of obligations imposed by the authorization engine before releasing any data to the requester. The obligations may be imposed on the GraphQL function itself, e.g., requiring a given technical capability, or be imposed on the data processing, e.g., requiring given conditions to be true before access is provided.

In some embodiments, the authorization engine applies the access policy by calling a policy engine, such as an OPA or a PDP. In other embodiments, the authorization engine includes hard coded access rules, so that no additional policy engine is required.

In some embodiments, the decision functions included in the obligation objects are first validated, i.e. the GraphQL function confirms that it is capable of invoking decision functions.

The step of ensuring that the operation results received from the GraphQL engine conform to the requirements conveyed by the obligation objects received from the authorization engine may include updating the operation results using the obligation objects. In other words, the GraphQL function may find that the operation results initially provided fail to comply with the requirements conveyed by the obligation objects, and, as a result, the operation results are modified so that they do comply with the obligations.

The data fetched from the plurality of data sources preferably conforms to a suitable schema, e.g., a user schema as defined by "System for Cross-domain Identity Management: Core Schema" (RFC 7643) or a client schema defined by section 2 of "OAuth 2.0 Dynamic Client Registration Protocol" (RFC 7591) or by section 2 of the specification "OpenID Connect Dynamic Client Registration 1.0".

A second aspect of the present invention relates to a system for authorizing access to a GraphQL request from a requester, comprising: a GraphQL engine configured to access data in a plurality of data sources; a GraphQL function configured to receive a message from the requester (the message including at least one operation including a selection set identifying data to be fetched from a plurality of data sources and an access token containing subject data), and authenticate the subject using the access token; and an authorization engine configured to receive a call from the GraphQL function including the name of the GraphQL function and the subject data, and to return an authorization decision and a set of obligation objects, each obligation object including one or more decision functions, wherein the GraphQL function is further configured to cause the GraphQL engine to execute the operation and fetch data from the plurality of data sources that correspond to the selection set in the operation; receive results of the operation from the GraphQL engine, invoke the decision functions of the obligation objects received from the authorization engine are conformed to using the operation results received from the GraphQL engine, and, if the decision functions return an approval, return the operation results to the requester.

A third aspect of the present invention relate to a computer program product comprising computer program code portions configured to perform the method according to the first aspect when executed on a computer processor.

BRIEF DESCRIPTION OF THE DRAWINGS

The present invention will be described in more detail with reference to the appended drawings, showing currently preferred embodiments of the invention.

DETAILED DESCRIPTION OF CURRENTLY PREFERRED EMBODIMENTS

The present disclosure relates to a method, system, and computer program for authorizing access to a GraphQL function that uses an authorization engine and conforms to any obligations imposed upon the GraphQL function as it carries out the authorization decision. A GraphQL function is a component, function, Application Programming Interface (API) or similar that receives GraphQL operations and ultimately returns results based on logic embodied therein. The authorization engine as used herein is a novel function, component, or similar that makes authorization decisions. In the context of the extensible Access Control Markup Language (XACML) standard, the authorization engine would interact with a Policy Decision Point (PDP), and the GraphQL function would be comparable to a Policy Enforcement Point (PEP). In the present disclosure, however, the expressions authorization engine and GraphQL function are used more generally and not restricted to the meaning of a PDP or PEP defined in the XACML specification or bound in any way to usage conforming to XACML.

The obligation objects used in the present disclosure refer not simply to a go-between for a PDP and a PEP to be used in cases when the PDP cannot make a qualified decision at the given time. Instead, the obligation objects provide an intermediary which possesses logic, knowledge, and techniques that allow the decision to be remade with additional inputs to determine if the request should be allowed. An obligation object in the present disclosure includes a decision function which is provided with the authorization engine's pre-made decision and other inputs, allowing the obligation object to potentially refine or reevaluate the decision at a later stage in the GraphQL function.

The inputs to the authorization engine vary. In a typical case, the inputs will be a plurality of attributes that represent a subject of the authorization (e.g., client, user, etc.), the resource being acted upon, the action being performed on that resource, and contextual data (e.g., time of day, network access path, etc.). This action is disjoint from a GraphQL operation; examples include things such as "query dynamic clients," "change dynamic client status," "query accounts," and "create accounts." These attributes may be simple name/value pairs, but, in most practical embodiments, the value will be a set of complex objects that include not only a value but the identifier of the authority asserting that value, its format, and other metadata. This input allows the authorization engine to make sophisticated authorization decisions. Not all four classes of attributes need to be provided; it is perfectly acceptable for the authorization engine to accept only inputs pertaining to the subject, for instance.

Figure 1:
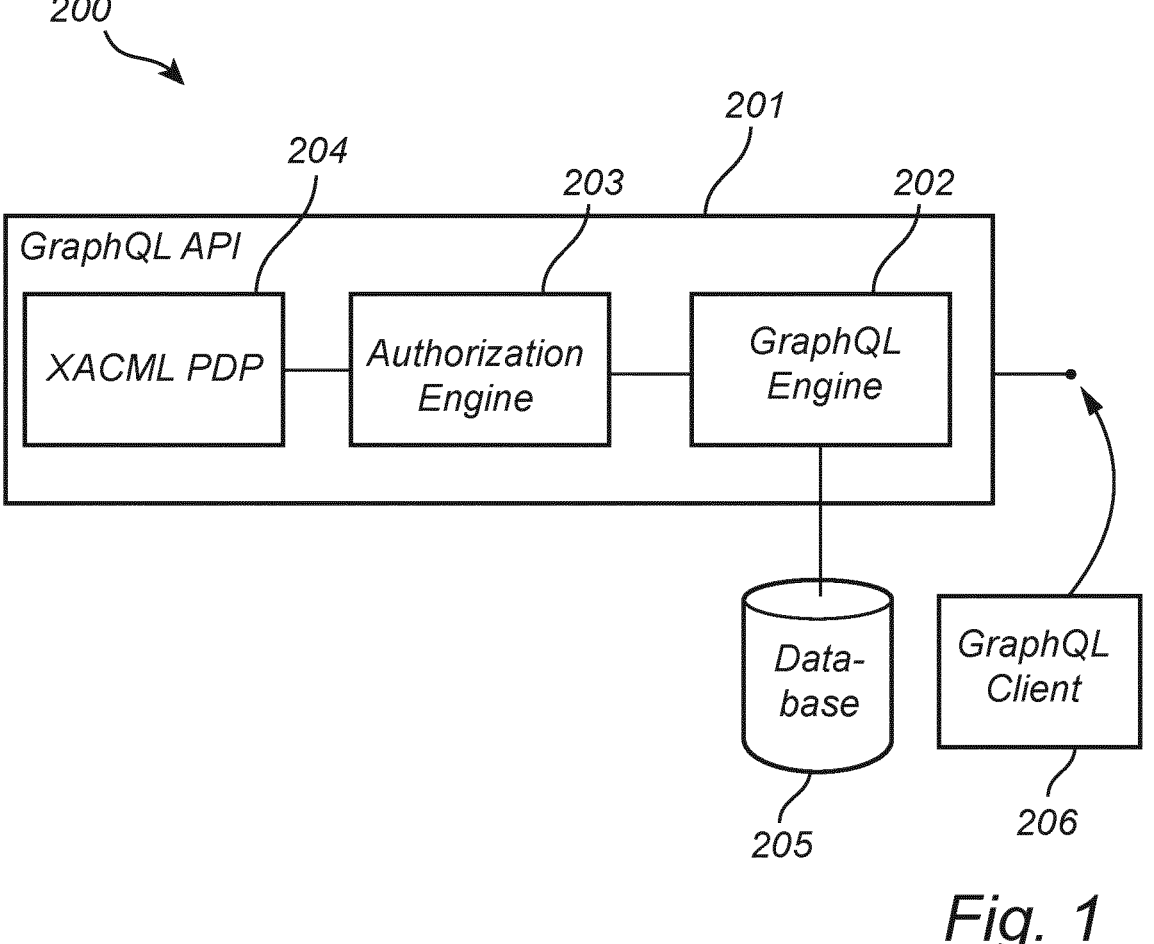
FIG. 1 is a block diagram of a system according to an embodiment of the present invention.

In FIG. 1, the GraphQL function is realized as a GraphQL API 201 which is consumed by the requester, here a GraphQL client 206. A GraphQL engine 202 is co-located with the GraphQL API 201. The API 201 further comprises an authorization engine 203 applying an authorization policy by interacting with a XACML PDP 204 acting as a policy engine. The authorization engine 203 may use the XACML protocol to render policy-based authorization decisions, in which case it uses a XACML PDP 204. The data sources consumed by the GraphQL engine 202 are shown in FIG. 1 as a relational database 205.

In FIG. 1, the policy engine (the XACML PDP) 204 and the authorization engine 203 are both co-located with the GraphQL function (API) 201, i.e., they reside in the same logical unit. The perimeter of this logical unit may be the address space of a computer program, the same computer where they are both executing as different processes, the same network where they are running on different computers within that network, etc.

The authorization engine and the policy engine can also be remote from one another. By this it is meant that the authorization engine and policy engine reside in different logical units. This is illustrated in FIG. 2.

Figure 2:
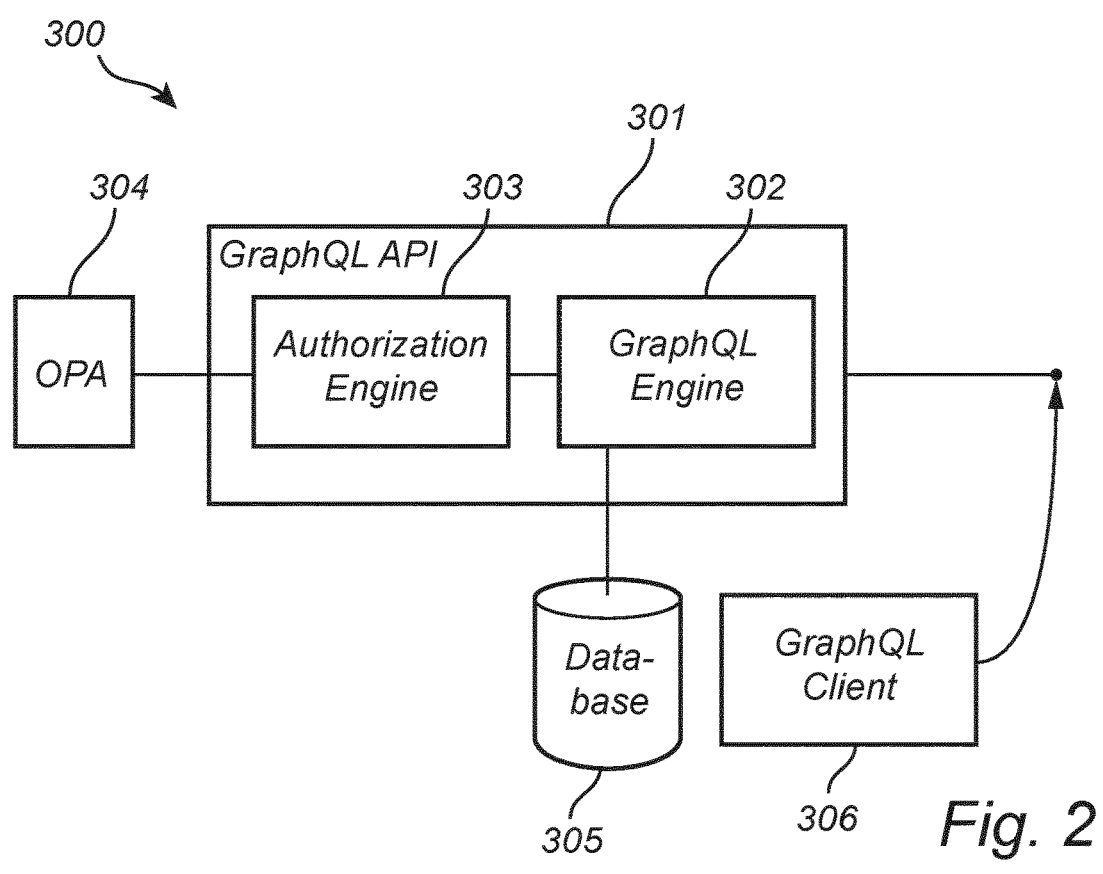
FIG. 2 is a block diagram of a system according to a further embodiment of the present invention.

In FIG. 2, the GraphQL function is again a GraphQL API 301, which is invoked by a requester shown as a GraphQL client 306. The API 301 includes an authorization engine 303, similar to the authorization engine in FIG. 1, but which is configured to call a policy engine 304 which is separate from the GraphQL API 301. In this case, the policy engine is an Open Policy Agent (OPA) 304. In this embodiment, the GraphQL API 301 would invoke an API of OPA 304. In exemplary implementations of such an embodiment, this OPA API call would be a web service, but this is not a requirement per se.

In both FIGS. 1 and 2, the GraphQL API 201, 301 will execute the operation in a GraphQL engine 202, 302 which would fetch data from a plurality of data sources 205, 305. In other words, the topology referred to herein does not pertain to the call from the GraphQL function to the GraphQL engine nor its call to the data sources. Their topology is a different consideration that is obvious to a reader skilled in the art.

Figure 6:
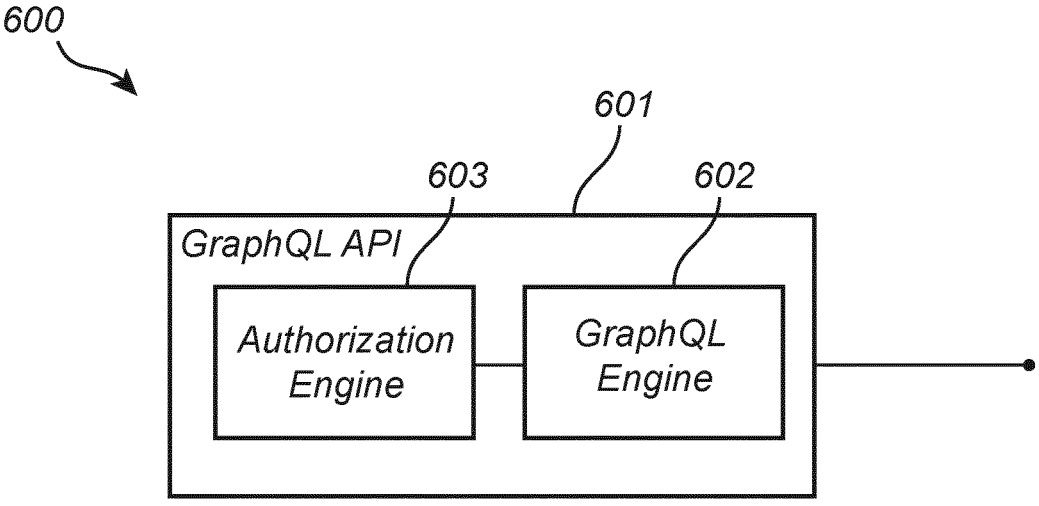
FIG. 6 shows an embodiment that does not have an independent policy engine where the authorization engine can make decisions based on logic within its implementation.

From the previous examples it should not be misunderstood that an authorization engine always depends on a policy engine. For instance, FIG. 6 shows an embodiment without an independent policy engine where the authorization engine 603 can make decisions based on logic within its implementation. As an example of such an embodiment, the authorization engine 603 may enforce simple CRUD (Create, Read, Update, Delete) operations that ensure that certain users are allowed to perform a combination of the CRUD operations based on their group membership. In such embodiments, an independent policy engine (like a PDP or an OPA) is unnecessary in realizing the present invention, but the authorization engine is not.

Figure 3:
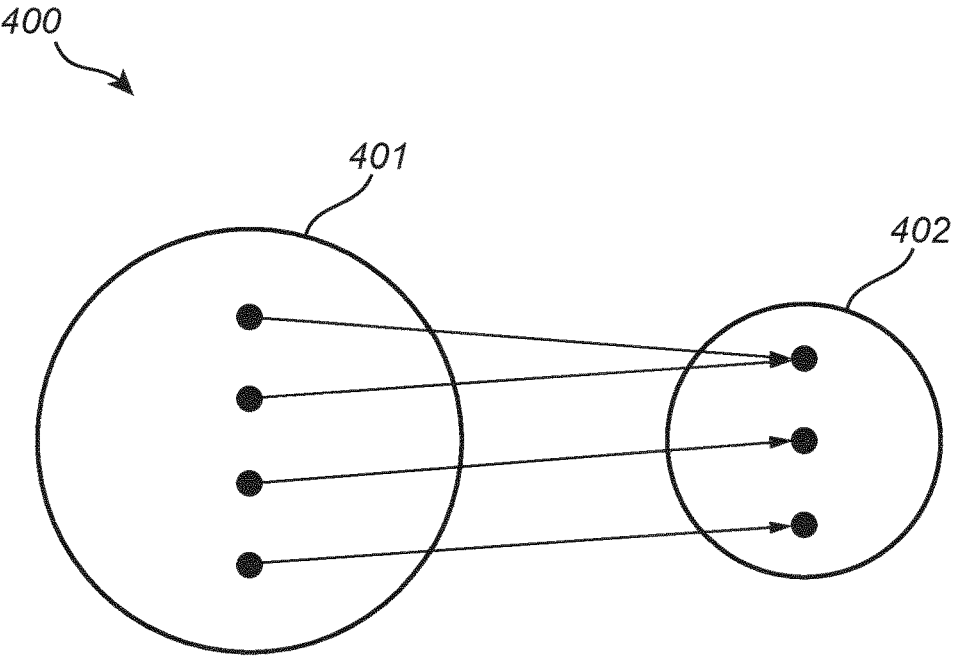
FIG. 3 shows an example of the authorization engine in FIGS. 2 and 3.

The authorization engine 203, 303, 603 arrives at its decisions by accepting inputs and returning a decision to permit or deny the request or an answer that it is not applicable to decide such inquiries. This mapping is illustrated as a surjective function 400 in FIG. 3. The authorization engine maps all possible inputs in an input set 401 to an output set 402. The output set consist of the three possible authorization decisions—permit, deny, and not applicable. This mapping can be complex. For this reason, the authorization engine often arrives at its decisions using a policy written in a policy language that is declarative in nature. This is often the case because the inputs are typically many, the number of possible decisions is vast, and the logic of making the decisions is quite complicated. A policy language helps overcome these issues and simplifies the management and auditability of access. Examples of such policy languages include Rego and XACML but there are many others.

As mentioned, the authorization decision of an authorization engine may be ternary. In other words, the authorization engine will answer the question of whether a request is authorized with an answer of i) permitted, ii) deny, or iii) not applicable. This need not be the case, however. The authorization engine can alternatively render binary decisions, where an inapplicable call to the authorization engine is treated as either access allowed or denied. A decision of not applicable can occur when, for example, the authorization engine uses a policy-based approach to render decisions and no policy exists to ascertain a permit or deny decision.

Figure 4:
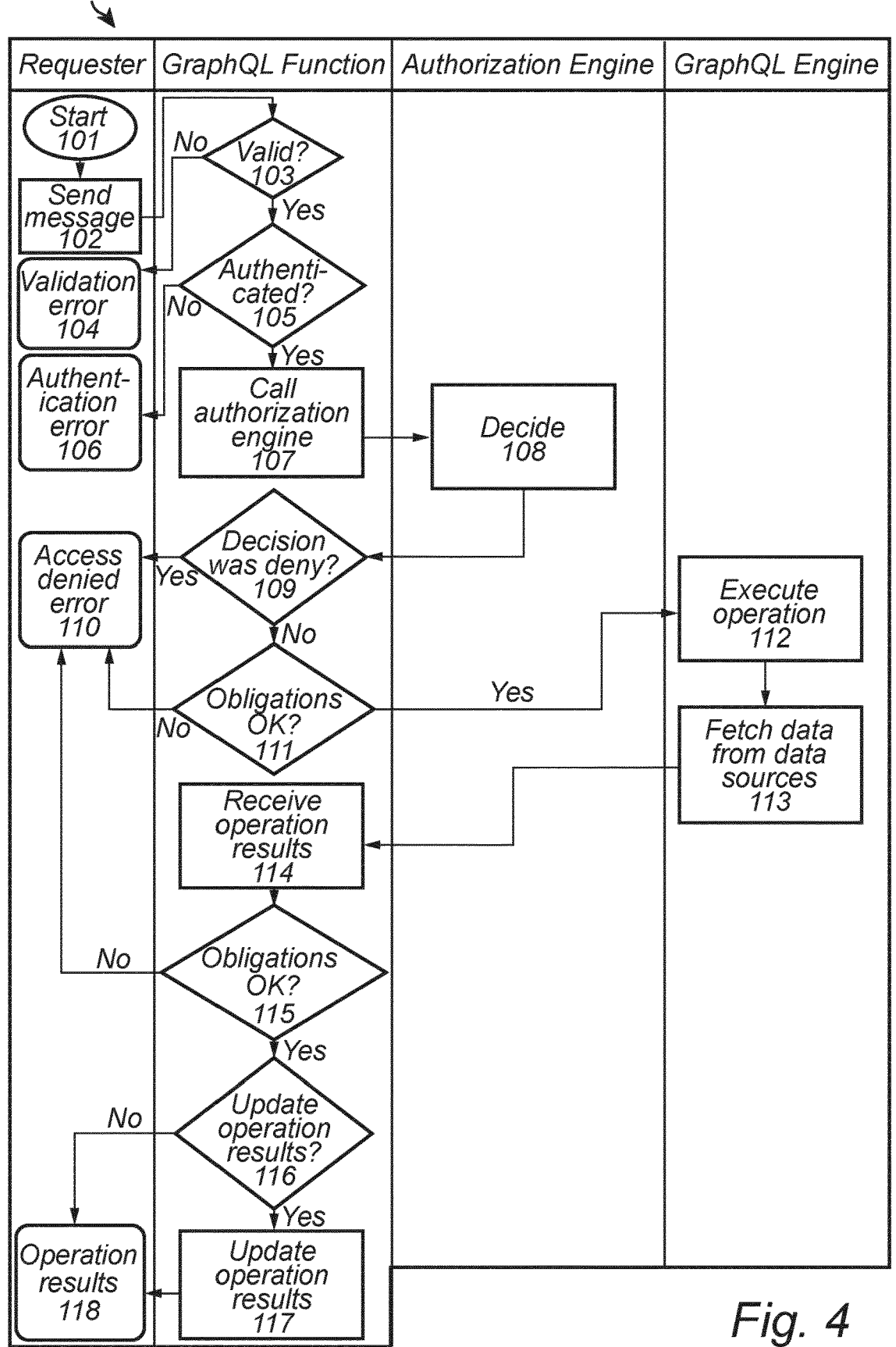
FIG. 4 is a flow chart of a method of authorizing GraphQL access using an authorization engine and conforming to its obligations according to an embodiment of the present invention.

The operation of the system will now be discussed with reference to FIG. 4. The process 100 starts in step 102 with a requester (e.g., client 206, 306) sending a message to the GraphQL function (e.g., an API 201, 301) on behalf of an authenticated subject (e.g., a user). When the GraphQL function 201, 301 receives the message sent from the requester, the GraphQL function validates the message in step 103. For example, consider one embodiment where the GraphQL function is made available to the requester as an API 201, 301 that is accessible over the Hypertext Transfer Protocol (HTTP). In such an embodiment, the GraphQL function 201, 301 would validate the HTTP method and the content type of the HTTP payload. In embodiments where the requester encodes its message as shown in Listing 1 below, the GraphQL function could ensure that the message conforms to the required schema (e.g., that it is a JSON object with an operationName field, a query field, etc.). If this validation fails, an error is returned to the requester in step 104.

```
{
    "operationName": "GetAccountByUsername",
    "variables":
    {
        "myGoodVariable": 22
    },
    "query": "..."
}
```

Listing 1: Pseudocode of Part of a GraphQL Message, Sans the Access Token, with the Operation Elided.

After performing such basic message validation, the GraphQL function in step 105 authenticates the subject on whose behalf the request is made. To communicate the subject's identity to the GraphQL function, the message includes an access token pertaining to the subject and containing subject data. If authentication fails, an error is returned to the requester in step 106. In one embodiment, this access token is communicated to the GraphQL function in accordance with "The OAuth 2.0 Authorization Framework: Bearer Token Usage" (RFC 6750). An example of such is shown in the pseudocode of Listing 2:

```
POST /graphql
Host: www.example.com
Content-Type: application/json
Authorization: Bearer b6eb8fba-2c65-4195-90c6-a182d1fce3a7
Content-Length: 1008
{
    ...
}
```

Listing 2: Pseudocode of an Exemplary GraphQL Message that is Relayed Over HTTP and Includes an Access Token According to RFC 6750

Messages that are sent in such an embodiment include an Authorization HTTP request header with a value. That value starts with the word "bearer" followed by white space and then an access token. This token encodes data into it or, as in the example in Listing 2, refers to such data which relates to the subject of the authentication. The body of the HTTP request is elided in the previous listing but would be something like the pseudocode shown in Listing 3 below.

By performing very little processing of the message, it is validated in step 103 and authenticated in step 105. Even if neither of these steps fail, however, the GraphQL function has not yet authorized the message. This can be done using the subject data from the access token in a straightforward and obvious manner, but this would not address key challenges associated with authorizing a GraphQL operation. In particular, the following would be unanswered by such a trivial approach:

1. Is not only the subject authorized to perform the operation but is also the requester authorized (e.g., can the requester on behalf of the subject mutate the nodes in the selected data graph or only query them)?

2. Is the subject and is the requester on behalf of the subject authorized to access the data in the selected portions of the data graph or only parts of it?

These more complicated questions would remain unanswered by simply considering the authentication subject data in the access token because the body is entirely unprocessed in such a case (cf. the GraphQL message as shown above in Listing 1). The method and system disclosed in US 2020/ 0226140 mentioned above would also not help at this point because no schema data is available.

To this end, the next step is to call the authorization engine 203, 303 from the GraphQL function in step 107. In the present example, the GraphQL function 201, 301 sends to the authorization engine 203, 303 the subject data from the access token, data about the GraphQL function itself, action data (e.g., the HTTP verb being used), and contextual data. This data is in the form of attributes as mentioned previously, but this data is limited because the operation has not yet been executed within the GraphQL engine. Consequently, the operation name and other such details are not included. The authorization engine 203, 303, calculates an authorization decision in step 108. The decision may be based on rules hard-coded into the authorization engine, or be a result of a call to a policy engine, such as a PDP 204 or an OPA 304. The authorization decision is sent back to the GraphQL function. This decision will be permit, deny or not applicable. If the decision in step 109 is found to be deny or not applicable, the GraphQL function will return an access denied error to the requester in step 110.

With the decision, the authorization engine 203, 303 will also include a set of obligation objects that the GraphQL function 201, 301 observes as it carries out the decision of the authorization engine. The GraphQL function evaluate the obligation objects in step 111, and, if it cannot comply with or understand the obligation objects of the authorization engine, it will deny access regardless of the decision rendered by the authorization engine.

The authorization engine returns a set of obligation objects because the authorization engine had very limited information about what is being authorized at this point in the process; this is the case because the operation has not yet been executed in a GraphQL engine. Consider for instance: At the point when the authorization engine makes its authorization decision 108, it does not know if the operation intends to mutate the data graph or merely search it. It also doesn't know the parts of the data graph that are being operated on. Additionally, the authorization engine cannot consider the data that the requester wishes to select. For these reasons, the authorization engine is forced to make an authorization decision with a very limited set of inputs. Consequently, it will typically authorize the request based on the very few high-level inputs it receives with the call shown in step 107, but it will obligate the GraphQL function to check the operation more thoroughly after the operation has been performed.

Figure 5:
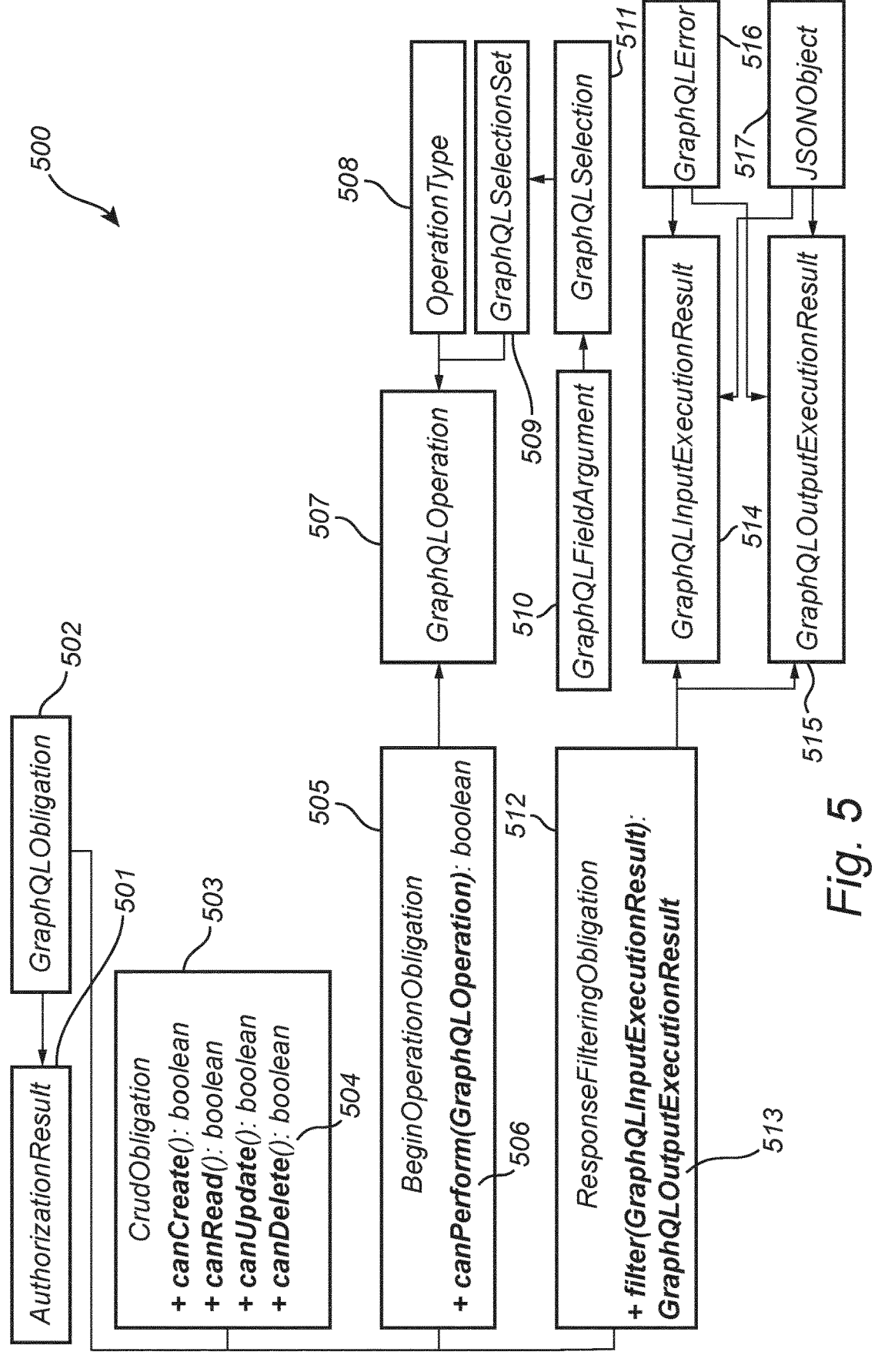
FIG. 5 is an UML class diagram representing obligation objects imposed by an authorization engine upon a GraphQL function according to one embodiment of the invention.

The obligation objects form a sort of contract between the authorization engine 203; 303 and the GraphQL function 201; 301. An example of such a contract is depicted in FIG. 5 as a UML class diagram 500 that may be used in one embodiment. This contract depicted in FIG. 5 is for certain obligation objects that the authorization engine may impose upon the GraphQL function. It shows that an authorization engine returns an AuthorizationResult 501 object to the GraphQL function. This AuthorizationResult 501 object contains a collection of GraphQLObligation 502 objects. Each of these has a type; in this example, those types are one of CrudObligation 503, BeginOperationObligation 505, or ResponseFilteringObligation 512. The first type of obligation in this contract, CrudObligation 503, provides four methods: canCreate, canRead, canUpdate, and canDelete (all together and individually referred to as 504). These example method names demonstrate how an obligation indicates to the GraphQL function that a permit decision can only be carried out if these particular Boolean functions return a true value. For instance, if the GraphQL function were to comply with a CrudObligation 503 by calling canUpdate 504 for a mutation operation and receive a false value, it would terminate the process with an error. Similarly, BeginOperationObligation 505 objects contain a function called canPerform 506. This method in the contact accepts a GraphQLOperation 507 object; this contains members that are of the types OperationType 508 and GraphQLSelectionSet 509. The latter object includes several GraphQLSelection 511 objects, each with a GraphQLFieldArgument 510. In this sample contract, this input may be used by this type of obligation to allow the authorization engine to impose upon the GraphQL function an obligation to perform a more complex check than the simpler CrudObligation 503 is able to do. Lastly, in this example contact of FIG. 5, there is a type of obligation called a ResponseFilterObligation 512. These kinds of obligation objects have a filter method 513 that accepts a GraphQLInputExecutionResult 514 object and returns a GraphQLOutputExecutionResult 515 object. Both may contain objects of type GraphQLError 516 or JSONObject 517. This type of obligation is an example of one that transforms instance data, as discussed above.

Of specific noteworthiness in the contact depicted in FIG. 5 is the fact there are two general types of obligation objects in this example: a first type that checks if an operation should be performed (CrudObligation 503 and BeginOperationObligation 505) and a second type that removes or filters out data from the operation results calculated by a GraphQL engine (ResponseFilteringObligation 512). Also note that like all interface definitions, this contract may be versioned and revised over time. This means that additional obligation objects may be returned from the authorization engine to the GraphQL function which it does not understand. In such a case, the GraphQL function would produce an error. If the authorization engine returned pre-existing obligation objects that are known to the GraphQL function, however, no error would result. Once the GraphQL function is upgraded to support the newer version of the contract, it could comply with the new obligation objects. In such a case, old obligation objects that the authorization engine returns would also continue working. If the older obligation objects were removed from the contract in a subsequent revision of the contract and the authorization engine continued to return them, the GraphQL function would product an error because they would no longer be understood.

Returning to FIG. 4, the GraphQL function first checks if the authorization engine 203, 303 returned any obligation objects with its authorization decision. If the decision of the authorization engine was not to permit the operation in step 109, the GraphQL function will return an access denied error in step 110. The GraphQL function 201; 301 will return an access denied error in step 110 if it cannot understand each of the obligation objects imposed by the authorization engine in step 111. Assuming the decision of the authorization engine was to permit the operation and the GraphQL function can understand the obligation objects imposed upon it by the authorization engine, the GraphQL function will execute the GraphQL operation in a GraphQL engine in step 112. In some embodiments, this may entail parsing the operation from an HTTP message like the one shown in Listing 2 above. In any case, the inputs to the GraphQL engine will be one of a plurality of operations. For instance, this could be a collection of operations as shown in Listing 3:

```
query # An operation, this one a query
   GetAccountByUsername # The operation name
{ # The start of the selection set
   accountByUsername(userName: "johndoe") # A selection
from the top-level selection set
   { # The start of a nested selection set
      id # A selection in the nested selection set
      userName # Also a selection
      delegations
      {
        id
        expires
        etc
      }
      etc
   }
   delegationsByUsername(userName: "johndoe") # Another
selection from the top-level selection set
   {
      id # A selection
   }
}
mutation # Another operation, this one a mutation
   DisableDel # The operation name
{
   disableDelegation(id: "dc43615c-5ca4-4fba-87f9-67085f4ae528")
# A selection
   {
      id
   }
}
```

Listing 3: Pseudocode of Part of a GraphQL Message, Sans Variables, the Operation Name that should be Executed, and the Access Token.

To inform the GraphQL engine about which of the plurality of operations to execute, the operation name previously provided to the GraphQL function from the requester is also input into the GraphQL engine. In cases where the operation is parameterized, the variables provided in the message received by the GraphQL function from the requester are also sent to the GraphQL engine. With the operations, operation name, and any variables as input, the GraphQL engine can execute the operation in step 113.

While executing the operation, the GraphQL engine may determine that the operation results should include certain data corresponding to the selection set it has received. This data may reside in a particular data source or various data sources. In the latter case, the kinds of data source used may also vary, even within a single implementation of the disclosure. For example, the GraphQL engine may source data from a relational database and simultaneously source it from an LDAP directory. Which data sources are used may depend on configuration and the selection set included in the operation received from the requestor. In one embodiment, for instance, the data source may be a relational database. In other embodiments, this data source may be an LDAP directory, a SCIM server, a NoSQL database, files in a file system, etc. Consider again the query in Listing 3 above. In such a case, the GraphQL engine may, for example, determine that a database should be queried to retrieve the value for the id and userName selected from the accountByUsername selection set located directly under the root of the data graph. In such a scenario, the GraphQL engine may also see that delegations should also be selected, and the GraphQL engine may determine that this part of the data graph should be obtained from a different data source (e.g., an Amazon DynamoDB instance). In this way, different parts of the operation results are fetched from a plurality of data sources in step 113. The amalgamated results are returned from the GraphQL engine to the GraphQL function in step 114.

The GraphQL function now has all the data that fulfills the requester's operation. It also knows of the obligation objects of the authorization engine and that it can surely understand them. So, the GraphQL function checks the obligation objects again in step 115—this time using the operation results. Using the full operation results, the obligation objects are conformed to. An example of such an obligation could be a AttributesCrudObligation as shown in FIG. 5 discussed above. For such an obligation, the operation results (in the form of attributes, again being name/value pairs in the simplest form) are considered to determine if a Create, Read, Update or Delete (CRUD) operation is permissible. For instance, when the operation is a query (as opposed to a mutation), the exemplary obligation's read method would be invoked by the GraphQL function. If this resulted in a negative value in step 115, the GraphQL function would return an access denied error message in step 110. In this manner, the obligation objects serve as a sort of delayed decision by the authorization engine where the full operation results can be used for authorizing access.

Because this is the pinnacle of the disclosure, this point is restated, and another example is provided to aid the reader in understanding (but not to restrict the disclosure to a specific embodiment). Consider a case where the authorization engine returned a permit decision 109 but imposed upon the GraphQL function the obligation to perform the check encoded in the logic of the GraphQLResponseFilteringObligation type depicted in FIG. 5. In 111, the GraphQL function ensures that it understands this obligation. If it does, the GraphQL function would try to fulfill the obligation using only the operation data it has at that point in the process 100. This verification of understanding and the initial check using limited operation information is what is depicted as step 111 in FIG. 1. These checks are limited though because, as mentioned above, the operation still has not been executed and limited data is available for consideration. Later, after the operation has executed in the GraphQL engine 112 and the operation results are available to the GraphQL function 114, conformance to the obligation objects of the authorization engine can be done in full consideration of the operation results including the selected data graph (i.e., instance data) from various data sources 205, 305.

Besides restricting access by denying the operation, a typical obligation the authorization engine will impose upon the GraphQL function is to remove or obscure the operation results. For instance, going back to the obligation ResponseFilteringObligation 512 shown in FIG. 5, an embodiment may remove certain data from the operation results which the authenticated subject is not authorized to access. Such alteration of the operation results is shown in steps 116-117 in FIG. 4.

If the obligation objects can be fulfilled after considering the entire operation results, the process returns the results to the requester 118. This concludes the process 100 with a positive outcome.

The person skilled in the art realizes that the present invention by no means is limited to the preferred embodiments described above. On the contrary, many modifications and variations are possible within the scope of the appended claims. For example, such an individual should realize that the data graph can be defined by a plurality of schemas.

For instance, the data in the graph may be related to the users, as touched upon above, and as disclosed herein as [claim 8]. It is on behalf of such a user that the requester invokes the GraphQL function. It is this user, in some cases, that is identified by the access token 106. A common schema for such user-related information is the one defined in "System for Cross-domain Identity Management: Core Schema" (RFC 7643) as claimed in [claim 9]. This schema lends itself to a graph-based representation because of the links included in the User object. This can be noted by observing all user schema types defined in RFC 7643 that have a reference type. When exposing such data using GraphQL, however, there is no way of authorizing access to the values of the entire schema in a fine-grained manner. The present disclosure overcomes this lack.

Another example of such a schema in this plurality of schemas defining a data graph that needs to be authorized in a granular manner as described herein is one of OAuth client data defined in "OAuth 2.0 Dynamic Client Registration Protocol" (RFC 7591) or "OpenID Connect Dynamic Client Registration 1.0". This data too can be queried or mutated using GraphQL in a way that is not defined by either of those specifications. This data can be quite complex and its usage in GraphQL increases that complexity. One additional complexity that such a graph-based presentation creates is the requirement for fine-grained access control to client data in the graph. This is the case because this data is often used in high-security scenarios. Unauthorized access to such data may result in dire consequences. For this reason, it is important to control access to it. There is no standard way to represent the OAuth client metadata defined in these two specifications using GraphQL nor is there any way to protect them when they are. For these reasons, the disclosure set forth herein is important to protect data that follows such schemas when accessed using GraphQL.

The invention claimed is:

1. A method for authorizing access to a GraphQL request, comprising:

receiving a message from a requester to a GraphQL function on behalf of an authenticated subject, the message including:
    at least one operation including a selection set identifying data to be fetched from a plurality of data sources, and
    an access token pertaining to the authenticated subject and containing subject data;
  authenticating the authenticated subject using the access token;
  making a call to an authorization engine applying an access policy, the call including at least the name of the GraphQL function and the subject data;
  receiving from the authorization engine an authorization decision based on the access policy, and a set of obligation objects, each obligation object including one or more decision functions;
  causing a GraphQL engine to execute the at least one operation and fetch data from a plurality of data sources that correspond to the selection set in the at least one operation;
  receiving operation results of the at least one operation from the GraphQL engine;
  invoking the one or more decision functions of the obligation objects received from the authorization engine using the operation results received from the GraphQL engine, wherein the step of invoking the one or more decision functions results in a modification of the operation results received from the GraphQL engine; and
  returning the modified operation results to the requester, when the one or more decisions functions return an approval.

2. The method according to claim 1, wherein the authorization engine applies the access policy by calling a policy engine.

3. The method according to claim 1, further comprising validating that the decision functions may be invoked.

4. The method according to claim 1, wherein the operation is one of a query and a mutation.

5. The method according to claim 1, further comprising validating the message before authenticating the subject.

6. The method according to claim 1, wherein the access token used to authenticate the subject is provided to the GraphQL function in accordance with "The OAuth 2.0 Authorization Framework: Bearer Token Usage" (RFC 6750).

7. The method according to claim 1, wherein the call to the authorization engine further includes metadata about the GraphQL function.

8. The method according to claim 1, wherein the data fetched from the plurality of data sources conform to a user schema defined by "System for Cross-domain Identity Management: Core Schema" (RFC 7643).

9. The method according to claim 1, wherein the data fetched from the plurality of data sources conform to an OAuth client schema, such as an OAuth client schema defined by section 2 of "OAuth 2.0 Dynamic Client Registration Protocol" (RFC 7591), or an OAuth client schema defined by is defined by section 2 of the specification "OpenID Connect Dynamic Client Registration 1.0".

10. A system for authorizing access to a GraphQL request from a requester, comprising one or more computer processors configured to execute code that causes the one or more processors to:

provide a GraphQL engine to access data in a plurality of data sources;
  provide a GraphQL function to:
  receive a message from the requester on behalf of an authenticated subject, the message including:
    at least one operation including a selection set identifying data to be fetched from a plurality of data sources, and
    an access token pertaining to the authenticated subject and containing subject data, and
  authenticate the authenticated subject using the access token; and
  access an authorization engine applying an access policy, which authorization engine is configured to receive a call from the GraphQL function including the name of the GraphQL function and the subject data, and to return an authorization decision based on the access policy, and a set of obligation objects, each obligation object including one or more decision functions;
  wherein the one or more processors are further configured to execute code that causes the one or more processors to:
    cause the GraphQL engine to execute the operation and fetch data from the plurality of data sources that correspond to the selection set in the operation;
    receive results of the operation from the GraphQL engine;
    invoke the one or more decision functions of the obligations received from the authorization engine using the operation results received from the GraphQL engine, wherein invoking the one or more decision functions results in a modification of the operation results received from the GraphQL engine; and return the modified operation results to the requester, when the one or more decision function returns an approval.

11. The system according to claim 10, wherein the authorization engine is configured to call a policy engine in order to apply the access policy.

12. The system according to claim 11, wherein the policy engine and the GraphQL function are co-located within the same logical unit.

13. The system according to claim 10, wherein the GraphQL function is an Application Programming Interface, API.

* * * * *